United States Patent [19]

Harding

[11] Patent Number: 5,249,362
[45] Date of Patent: Oct. 5, 1993

[54] QUICK RELEASE DEVICE FOR CHAIN SAWS

[76] Inventor: Alfred F. Harding, P.O. Box 7, Orleans, Calif. 95556

[21] Appl. No.: 886,729

[22] Filed: May 21, 1992

Related U.S. Application Data

[63] Continuation-in-part of Ser. No. 678,022, Apr. 1, 1991, which is a continuation-in-part of Ser. No. 612,247, Nov. 13, 1990.

[51] Int. Cl.$^5$ ............................................. B27B 17/02
[52] U.S. Cl. ........................................ 30/383; 30/381; 411/348; 411/393; 411/522
[58] Field of Search ................. 30/122, 382, 383, 385, 30/386, 387, 500, 381; 83/816; 411/354, 522, 523, 524, 348, 393

[56] References Cited

U.S. PATENT DOCUMENTS

| | | | |
|---|---|---|---|
| 2,352,392 | 6/1944 | Kost | 411/523 |
| 3,232,325 | 2/1966 | Hamilton | 30/386 |
| 3,453,926 | 7/1969 | Engelmann | 411/523 |
| 4,382,334 | 5/1983 | Reynolds | 30/382 X |
| 4,677,746 | 7/1987 | Raiski | 30/122 |
| 4,819,335 | 4/1989 | Alexander | 30/500 |

FOREIGN PATENT DOCUMENTS

2168646 6/1986 United Kingdom .................. 30/383

Primary Examiner—Frank T. Yost
Assistant Examiner—Clark F. Dexter
Attorney, Agent, or Firm—Robert J. Schaap

[57] ABSTRACT

A quick release device for use with chain saws and which is adapted to quickly attach a bar and chain to the motor assembly of the chain saw. The quick release device comprises a body having an upper jaw and lower jaw. The jaws are adapted to engage notched ends of studs extending from a motor assembly and thereby clamp the bar and chain to the motor assembly. A rotatably threaded shaft cooperates with the body in a unique manner such that turning of the shaft in a manner which causes a clamping action actually biases the jaws away from one another. A head is located on the threaded shaft with a plurality of apertures so that one can readily engage an aperture with a tool thereby facilitating manipulation of the head.

24 Claims, 9 Drawing Sheets

FIG.—20

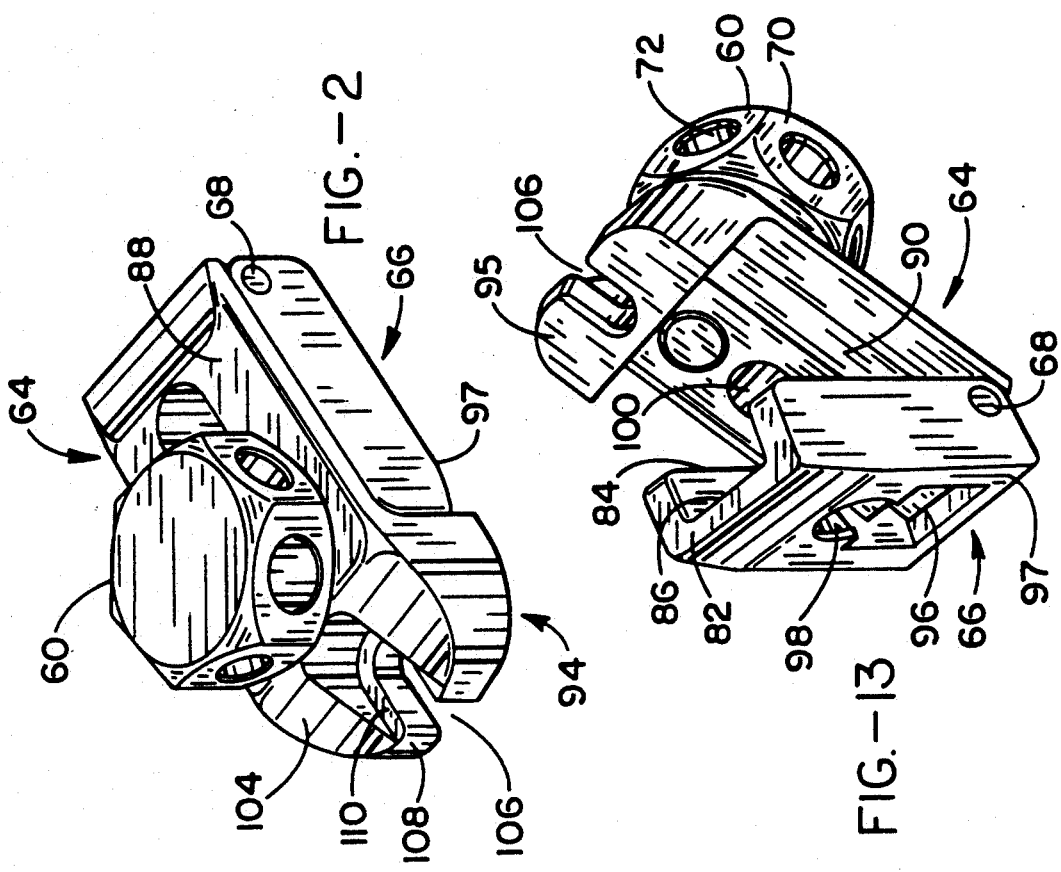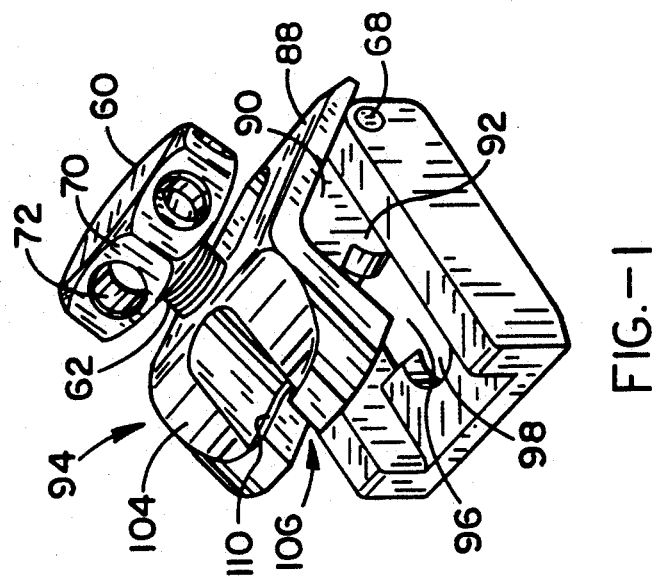

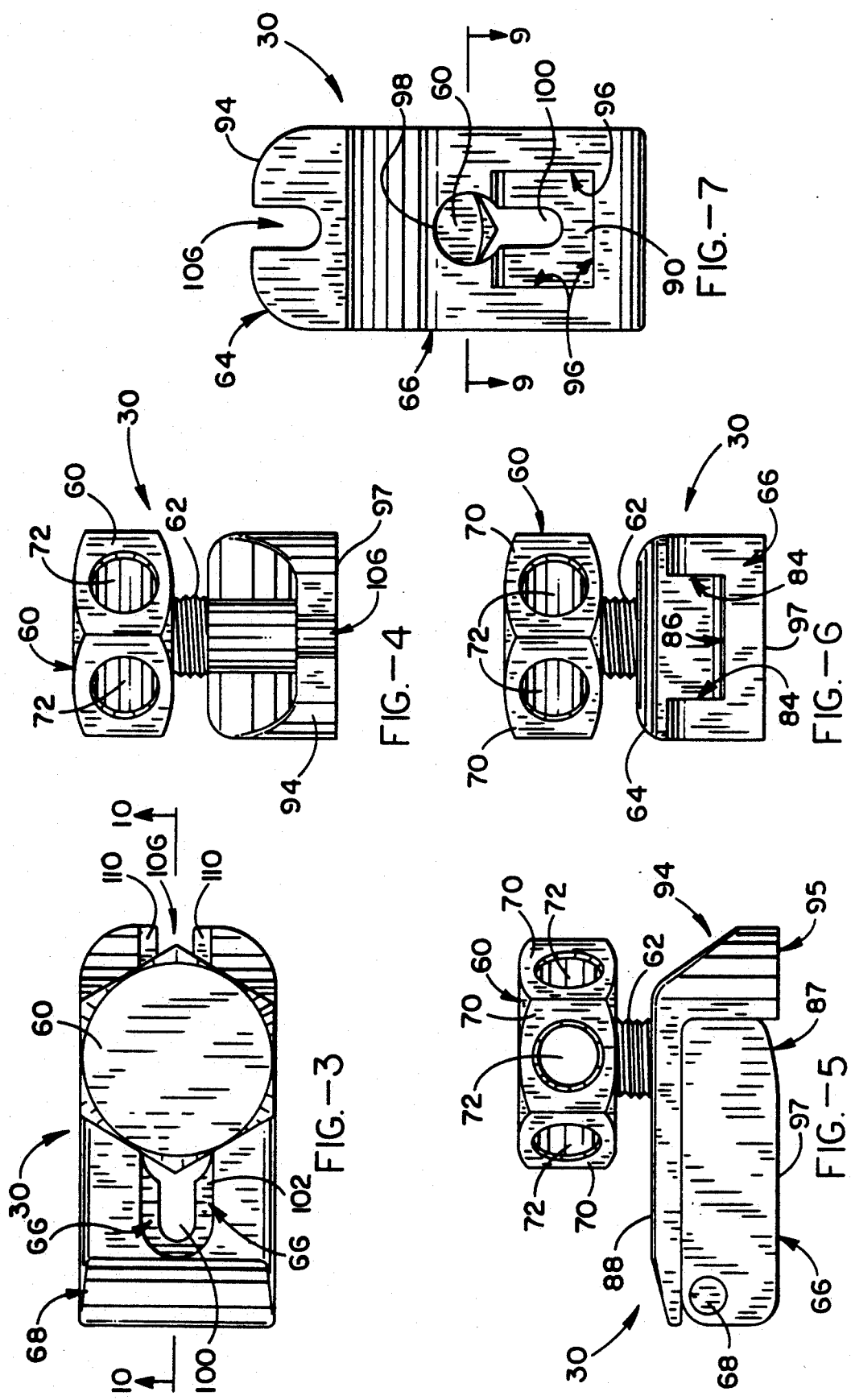

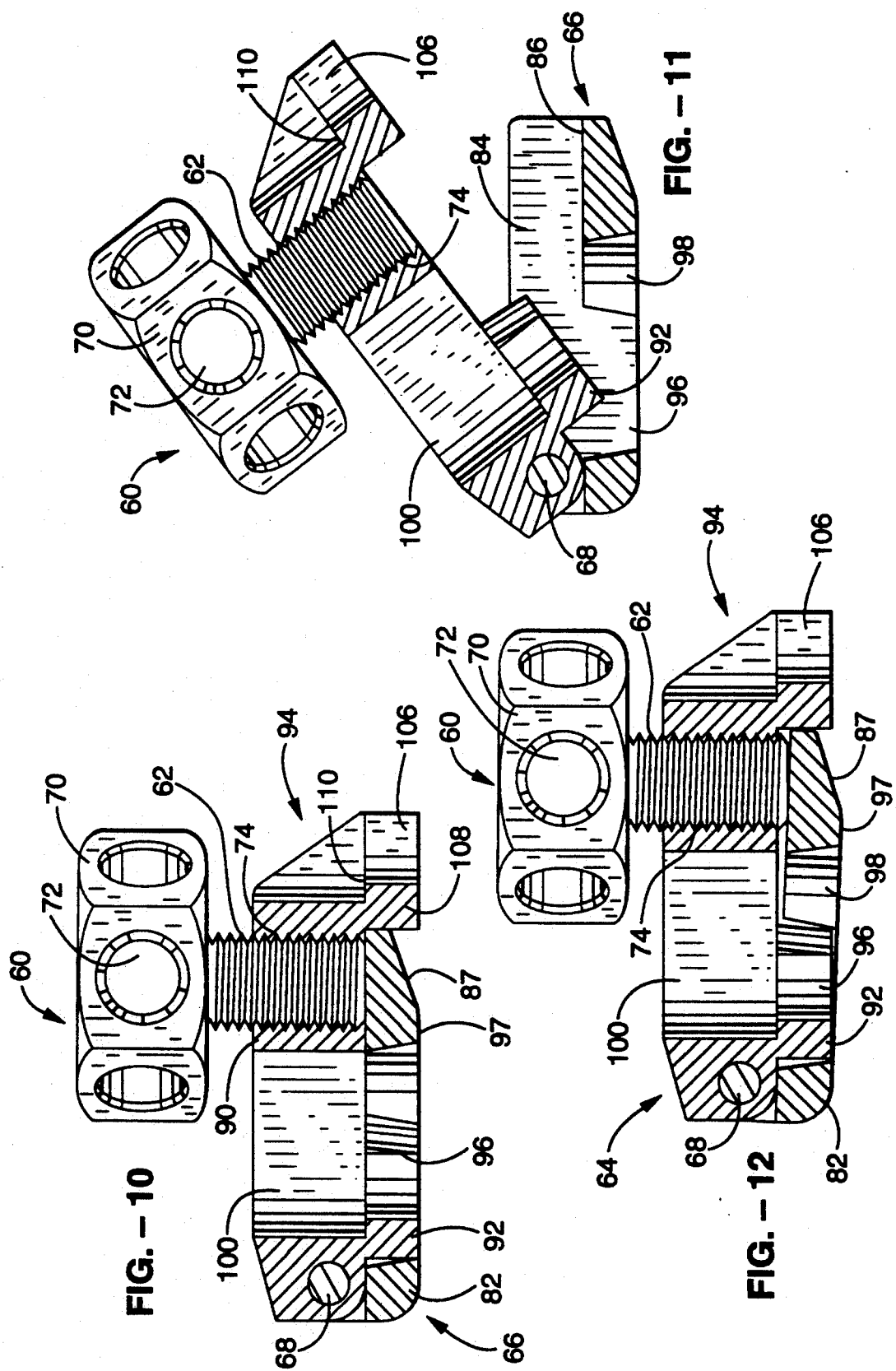

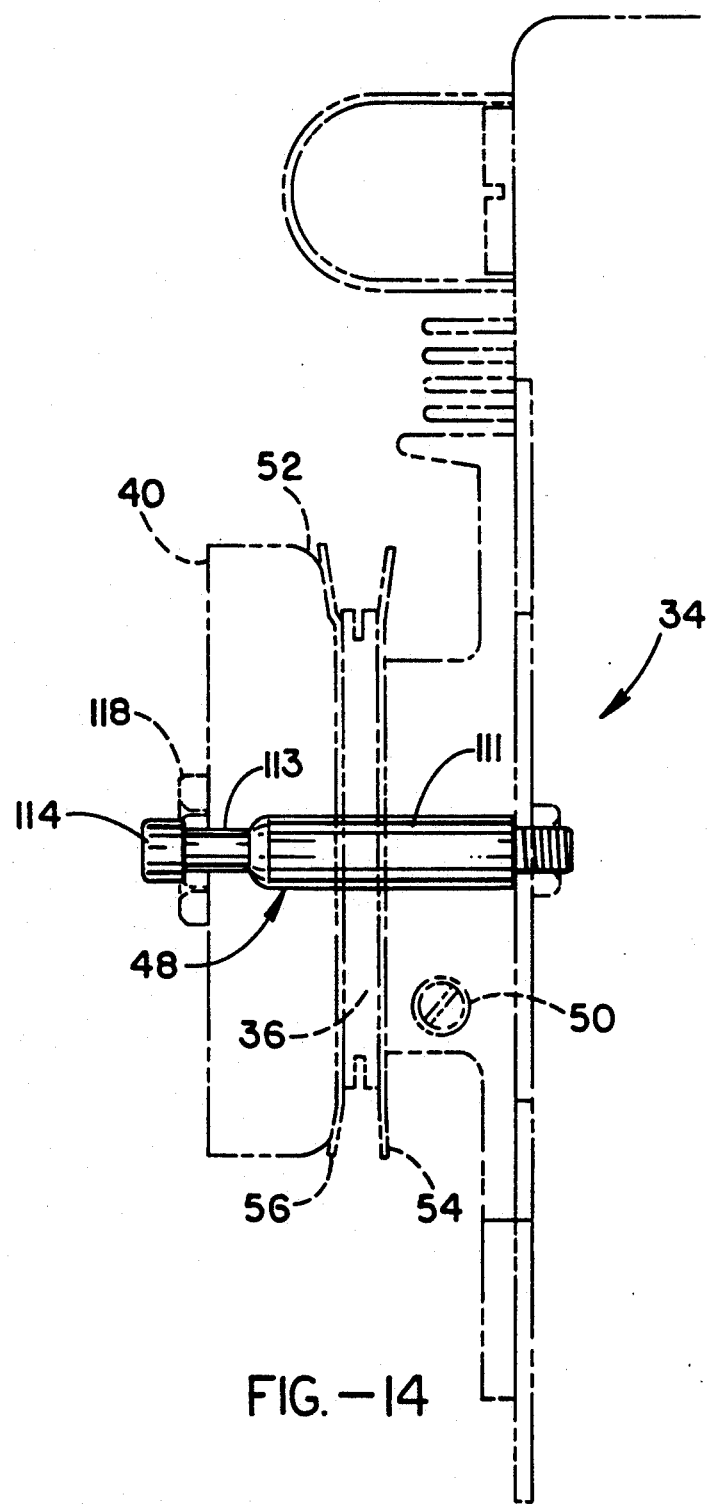
FIG.—14

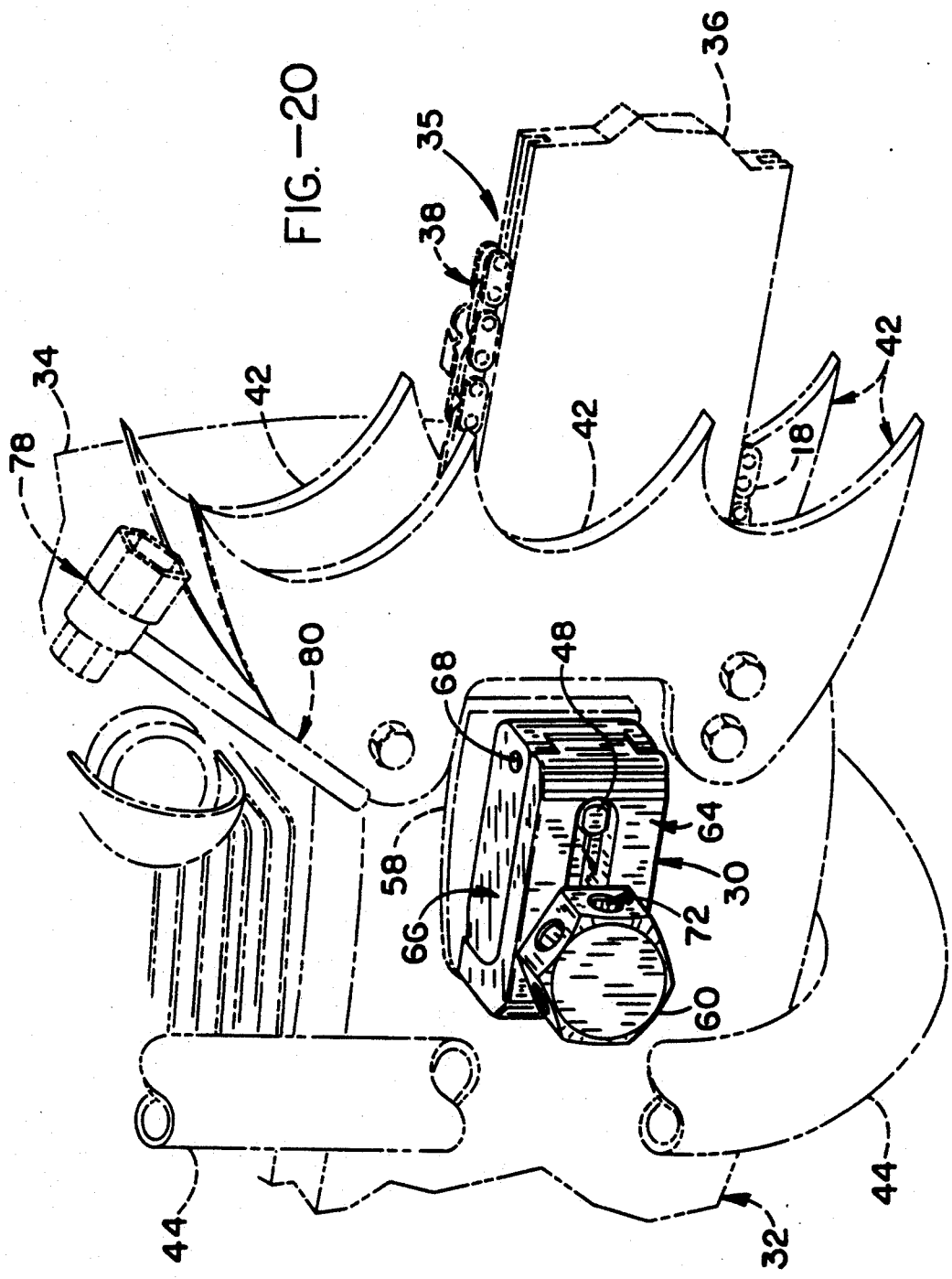

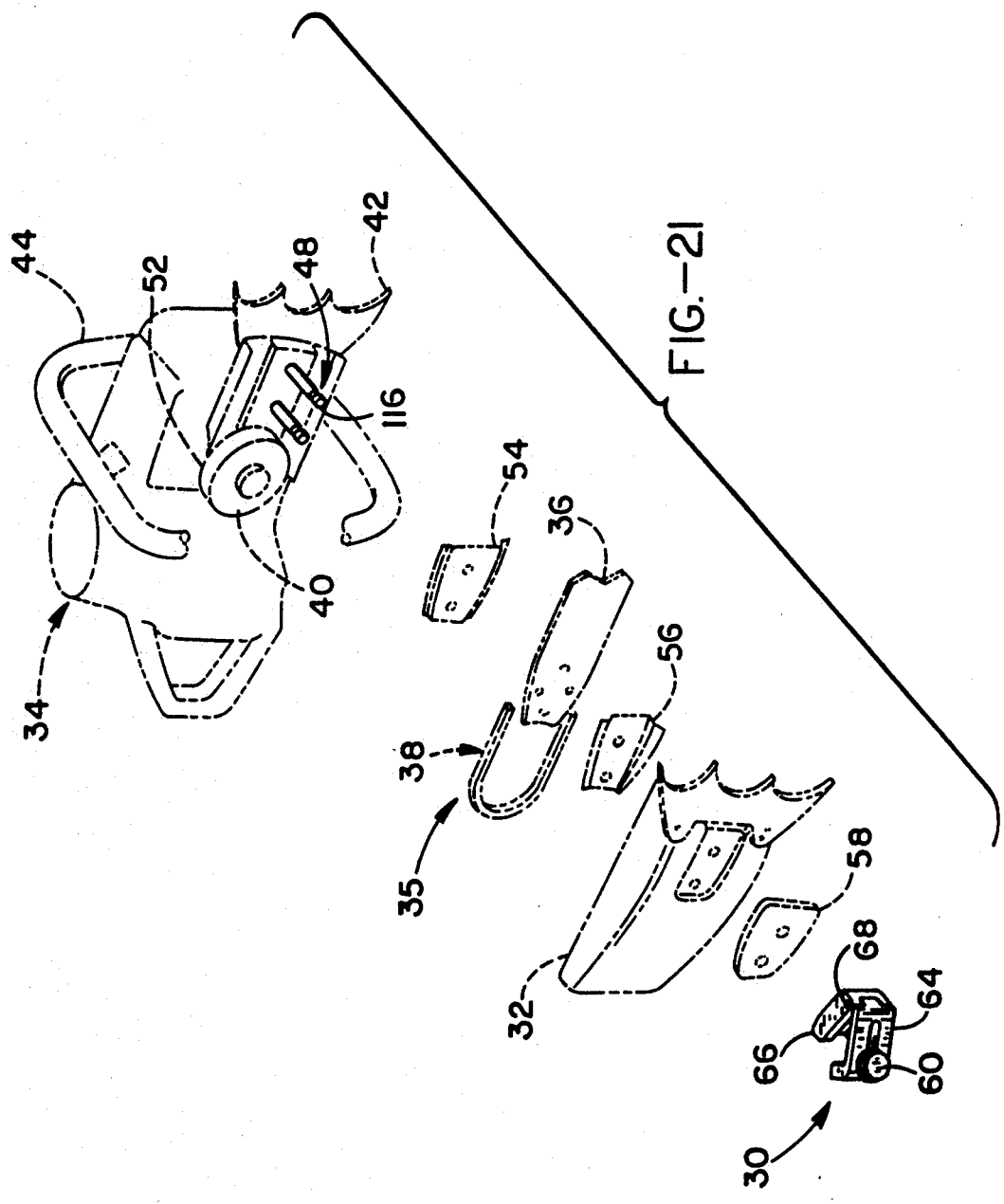

QUICK RELEASE DEVICE FOR CHAIN SAWS

RELATED APPLICATION

This application is a continuation-in-part of my co-pending U.S. patent application Ser. No. 678,022, filed Apr. 1, 1991, entitled "Quick Release Device for Chain Saws," and which is a continuation-in-part of my design patent application Ser. No. 612,247 filed Nov. 13, 1990.

BACKGROUND OF THE INVENTION

This invention relates generally to a quick release device for chain saws that enables a user to very rapidly disconnect a chain saw's motor assembly from the bar and chain of the saw, thereby advantageously allowing one to retain possession of the more valuable motor assembly whenever the less valuable bar and chain of the saw become captured, vise-like within the tree which the user is cutting down. The chain saw bar often becomes trapped only moments before a collapsing tree begins hurtling earthward, thus forcing the user to jeopardize his (or her) life in order to attempt to salvage the captured chain saw by prying it loose from the tree trunk. More particularly, this invention relates to a quick release device for rapidly allowing one to detach a side plate of the chain saw motor housing, thereby gaining immediate access to the area where the chain saw bar and motor assembly are joined, so that separation of the motor assembly from the bar can be accomplished quickly enough that the user can escape with the motor assembly intact, forfeiting the bar and chain, but avoiding the fury of the falling tree.

Prior to this invention, loggers often lost their chain saws because the tree being sawed would begin to collapse in a direction other than that intended by the strategic cuts made by a knowledgeable logger. A collapsing tree trunk can grip a chain saw bar (the structure supporting the chain) like a vise, making it extremely difficult for the most Bunyanesque of loggers to wrench the chain saw free. Moreover, a logger has little time to rescue the captured chain saw because the threat posed by the collapsing tree demands an immediate evacuation of the area. Commonly faced with this rapidly unfolding hazard, the logger has no choice but to flee for his life, abandoning the saw, which is often smashed when the tree finally falls.

The motor assembly of a heavy duty logger's chain saw is quite expensive (e g. $850.00) while the bar and chain of the chain saw are relatively cheap (e.g. $75.00) which is less then ten percent (10%) of the value of the motor assembly. Thus, it would be advantageous if loggers had the opportunity to salvage the motor assembly and abandon only the bar and chain, by quickly disconnecting these elements. As it stands now, one of the logger's worst nightmares is often occurring; namely forfeiture of his entire chain saw (e.g. $900 value), thus losing his means to make a living, because of the unpredictable, and often dangerous way that a falling tree can break apart.

Previously, there did exist a way to separate the chain saw bar from the motor assembly, however, this separation could not be quickly executed, as is necessary to salvage a chain saw stuck in the midst of a collapsing tree. Conventional chain saws have a side plate that is removable from the motor housing, thereby allowing one access to a junction point where the chain and bar are interconnected with the motor assembly. Unfortunately, conventional chain saws secure this side plate to the motor housing using threaded nuts These threaded nuts are removable, but not in an ultra-rapid fashion. Furthermore, removal of these nuts usually requires the use of tools, which may be unfeasible because of a collapsing tree trunk often grips the chain saw such that tool access to the nuts is hindered. Thus, some significant time is required to engage the nuts, loosen them and remove same. The task of accessing and loosening these nuts, and then effecting separation of the chain saw bar and motor assembly is made extremely difficult when a falling tree allows little time to act.

For the above reasons, there exists a significant need for a quick release device for chain saws which allows one to effect rapid separation of the motor assembly from the captured chain saw bar. The present invention fulfills this need in a relatively inexpensive fashion, thereby allowing loggers to save their most important equipment, and often their lives from being crushed.

BRIEF SUMMARY OF THE INVENTION

The present invention relates to a quick release device for attaching a cutting assembly as well as an outer side plate of a motor housing to the motor housing of the chain saw. The cutting assembly is almost always comprised of a chain saw bar along with a cutting chain which engages and is supported by the chain saw bar. In most chain saw motor assemblies, one or more studs extend outwardly from the motor assembly to receive the chain saw bar and the chain saw and to also receive the outer side plate.

In accordance with the present invention, there is provided a quick release clamping device which is capable of holding the cutting assembly and the outer side plate to the motor assembly. Normally, the cutting assembly and the side plate are retained on the studs and secured to the motor assembly by means of conventional nuts. However, in an emergency where it is necessary to immediately release the cutting assembly from the motor assembly in order to save the latter, one cannot easily and quickly remove the nuts.

The quick release mechanism of the present invention is thereby effectively a substitution for these nuts and does allow a quick release of the clamping action which holds the cutting assembly and the outer side plate to the motor assembly. The quick release device of the present invention is therefore not a part of the cutting assembly and does not co-act with the cutting assembly, other than to hold the cutting assembly, often referred to a "cutting cassette" to the motor assembly.

The quick release device comprises a clamping member having a pair of jaws which are moveable relative to one another for simultaneously and releasably engaging the studs which extend outwardly from the motor assembly and thereby clamp the bar and chain of the cutting assembly and the outer side plate to the motor assembly of the chain saw. This clearly eliminates the need of the nuts to hold the side plate and the cutting assembly. A manually actuable mechanism is on the clamping means for rapidly tightening one of the jaws against the side plate without the nuts. This quick release device does not otherwise interact with the side plate or the cutting assembly, as aforesaid, except to clamp the cutting assembly and the side plate to the motor assembly. The manually actuable mechanism is adapted to release this clamping action also provided by the clamping member to thereby enable removal of the side plate and the cutting assembly.

In a more preferred aspect of the invention, the quick release device comprises a body having an upper jaw and a lower jaw to enable simultaneous engagement of the studs. A hinge means connects the upper jaw and the lower jaw and allows the upper jaw to move relative to the lower jaw. The clamping means is associated with the jaws on the body for receiving the studs of the motor assembly and allowing the studs to be clamped in the jaws. This clamping means also comprises a threaded shaft which extends into one of the jaws. The present invention is quite unique in that the clamping means causes a clamping action to lock the studs in the jaws when the threaded shaft is rotated to bias the jaws apart. In other words, the two jaws do not operate to clamp the studs in the jaws with a closing action. Moreover, the clamping action is released when the threaded shaft is rotated to allow one of the jaws to be moved toward the other of the jaws.

In a more preferred aspect of the invention, the upper jaw includes a first engagement means for releasably engaging one of the studs and a second engagement means. These engagement means may adopt the form of elongate slots in the upper jaw, allowing the quick release device to be shifted with respect to the axis of the studs in a direction perpendicular to the axis of the studs. The studs have notched end portions which engage flanges surrounding portions of the slots. Thus, when the upper jaw is biased away from the lower jaw, the notched portions of the studs will engage the flanges and thereby retentively hold the studs within the upper jaw. In this respect, it is to be noted that the lower jaw does not actually provide part of the clamping action as such.

The quick release device is also unique in that the upper jaw can be moved to a fully opened position with respect to the lower jaw when no clamping action is to be achieved. Furthermore, the rotatable member such as the threaded shaft, causes a clamping action when the rotatable member is rotated to bias and literally causes a movement of the upper jaw away from the lower jaw. However, in this case, the movement of the upper jaw is a limited movement.

This invention possesses many other advantages and has other purposes which may be made more clearly apparent from a consideration of the forms in which it may be embodied. These forms are shown in the drawings and are more fully described in the detailed description hereinafter. However, it is to be understood that this detailed description and the accompanying drawings are set forth for purposes of illustrating and describing the general principles of the invention and are not to be taken in a limiting sense.

BRIEF DESCRIPTION OF THE DRAWINGS

Figure 9:
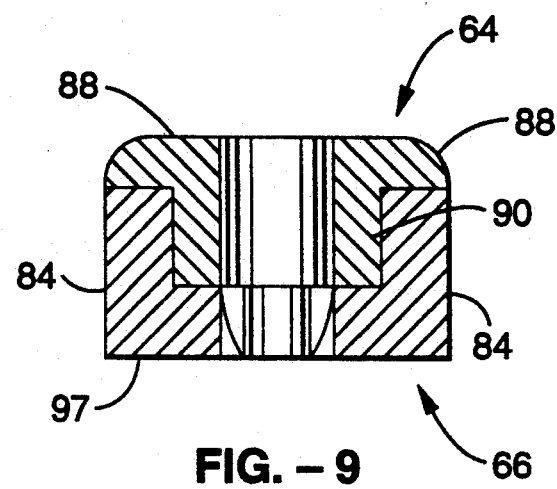
Figure 19:
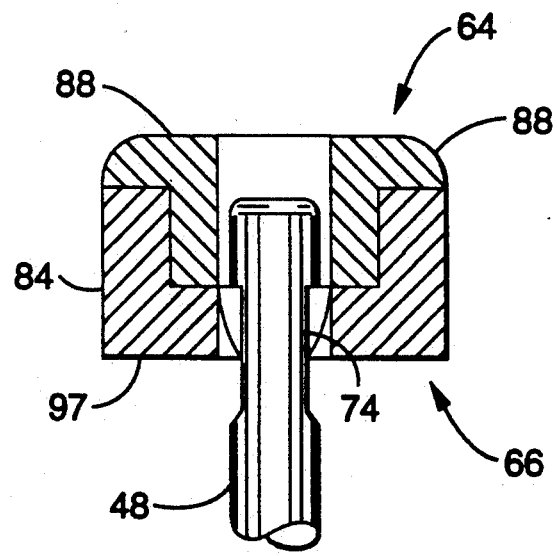
Figure 8:
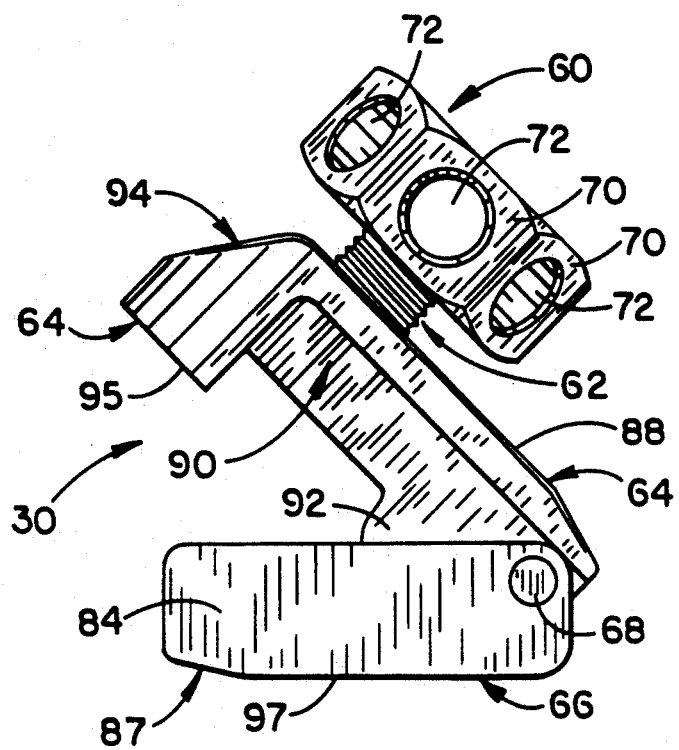
Figure 15:
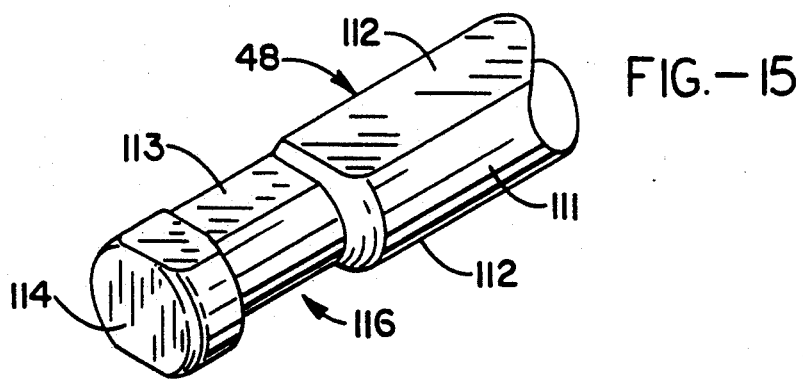
Figure 16:
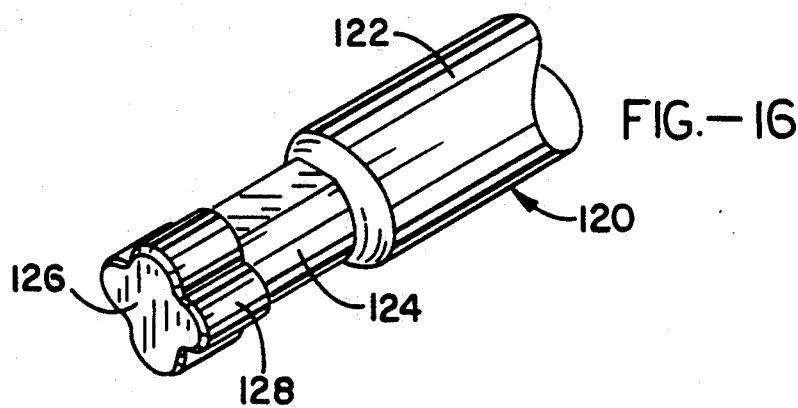
Figure 17:
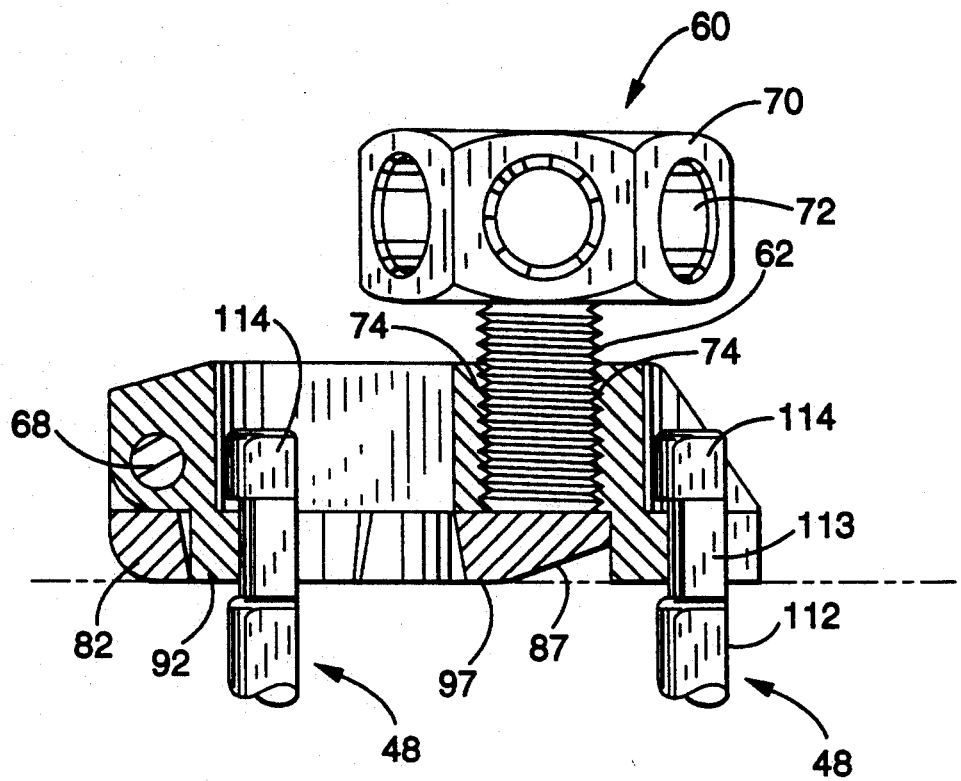
Figure 18:
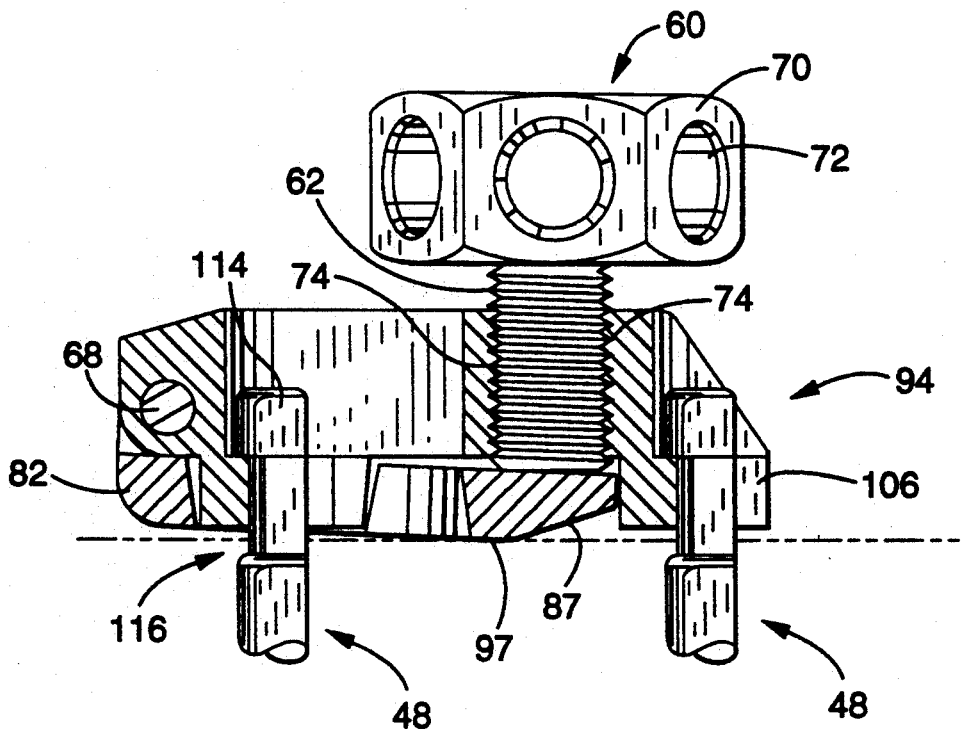

Having thus described the invention in general terms, reference will now be made to the accompanying drawings in which:

FIG. 1 is a perspective view of the quick release device constructed in accordance and embodying the present invention and showing a pair of jaws forming a part thereof in the open position;

FIG. 2 is a perspective view of the quick release device of FIG. 1 and showing the jaws in a closed position;

FIG. 3 is a top plan view of the quick release device;

FIG. 4 is a front elevational view of the quick release device;

FIG. 5 is a side elevational view of the quick release device;

FIG. 6 is a rear elevational view of the quick release device;

FIG. 7 is a bottom plan view of the quick release device;

FIG. 8 is a side elevational view of the quick release device, similar to FIG. 5, and showing the jaws in an open position;

FIG. 9 is a horizontal sectional view taken along line 9—9 of FIG. 7;

FIG. 10 is a vertical sectional view taken along line 10—10 of FIG. 3;

FIG. 11 is a vertical sectional view, similar to FIG. 9, and showing the jaws in an opened position;

FIG. 12 is a vertical sectional view, similar to FIGS. 10 and 11 and showing the jaws in a position that they would assume when clamped to a pair of studs;

FIG. 13 is a perspective view of the quick release device with the jaws in an opened position;

FIG. 14 is a fragmentary front elevational view of a portion of a conventional chain saw provided with the studs used with the quick release device of the present invention;

FIG. 15 is a fragmentary perspective view showing the studs used on the motor assembly of the chain saw;

FIG. 16 is a fragmentary perspective view of a modified form of stud which may be used with the motor assembly of a chain saw;

FIG. 17 is a vertical sectional view similar to FIGS. 10-12 and showing the quick release device shifted with respect to a pair of studs to be located in a clamping position but where the device is not yet clamped to the studs;

FIG. 18 is a sectional view, similar to FIG. 17, and showing the position of the jaws of the quick release device in a clamping position;

FIG. 19 is a vertical sectional view similar to FIG. 9, but showing one of the studs in a clamped position in the jaws;

FIG. 20 is a fragmentary perspective view of the quick release device in place on a chain saw in a manner securing the side plate of the saw to the motor housing, the chain saw bar, motor housing and its handle are all depicted in fragment; also illustrated is a standard tool having its handle aligned (indicated by dashed line) for engagement within one of the six apertures provided in the head of the quick release device, so that said head can be quickly manipulated by said tool; and FIG. 21 is a reduced, exploded view of the components of a chain saw adapted for use with the quick release device of the present invention, with the bar and chain saw handle being depicted in fragment, also illustrating two nonconventional aspects of this chain saw which make it especially adapted for compatibility with the quick release device, namely a pair of studs having a circumferential groove around their exposed ends, and an optional reinforcing plate located directly adjacent to the quick release device.

DETAILED DESCRIPTION OF PREFERRED EMBODIMENTS

As shown in the drawings for purposes of illustration, the present invention resides in a quick release device 30 that functions as a clamp for securing an outer side plate 32 (FIGS. 20 and 21) to a motor assembly 34 (FIG. 21). The quick release device 30 advantageously allows one to rapidly unclamp the side plate 32 from attachment to the motor assembly 34, thereby desirably enabling one to quickly gain the access necessary to rapidly separate a chain saw bar 36 (FIG. 21) from the chain saw motor assembly 34. This allows a logger to salvage the expensive motor assembly 34 by detaching it from the less valuable cutting assembly 35 comprised of the chain saw bar 36 (often referred to as a "support bar" or "guide bar") and a cutting chain 38. In this way, the cutting assembly 35 can be abandoned if stuck in a tree. This invention will result in many motor assemblies being rescued and retained, rather than crushed beneath a fallen tree.

The conventional chain saw comprises a motor-driven wheel 40 forming part of the drive mechanism that drives the chain 38 of the cutting assembly 35. Further, the conventional chain saw motor assembly is also usually comprised of a plurality of sharp blades or so-called "dogs" 42 and which are provided for gripping onto a tree trunk to enable easier cutting in a cutting operation. In addition, the conventional chain saw is provided with a handle 44, partially broken away in FIG. 21 so as to avoid obscuring any of the details of the invention.

The conventional chain saw motor assembly 34 also comprises one or more, and typically a pair, of outwardly extending studs 48. These studs 48 are usually externally threaded, although the studs, as illustrated in FIGS. 14 and 21, are not threaded for reasons which will presently more fully appear. The conventional motor assembly 34 also typically includes an adjustment screw 50 for adjustably positioning the chain 38 on the guide bar 36 and a clutch assembly 52 associated with a drive shaft.

By further reference to FIGS. 20 and 21, it can be seen that an inner bar plate 54 and an outer bar plate 56, which may be located outwardly of the support bar 36 with respect to the motor assembly 34, are also supported on the studs 48, as well as the outer side plate 32. A reinforcing plate 58 may also be used as shown in FIG. 21 in cooperation with the quick release device 30 and in accordance with the present invention. The use of this reinforcing plate 58 is hereinafter described in more detail.

With reference to the drawings in general, the unusual shape and operation of the quick release device 30 will now be discussed. The quick release device 30 is manufactured so that it comprises only four main parts, namely: (1) a hexagonal head 60 having a threaded neck or shaft 62, (2) an upper jaw 64, (3) a lower jaw 66, and (4) a hinge pin 68 that joins the upper jaw 64 to the lower jaw 66 such that the upper jaw 64 is movable relative to the lower jaw to a closed position (FIGS. 2, 5 and 10) and an open position (FIG. 1, 8, 11 and 13).

The hexagonal head 60 has six faces 70, with each having an aperture 72 bored completely through the head 60, such that an aperture 72 originating in one face 70 will exit out an opposing face 70. The central axis of each aperture 72 is substantially perpendicular to the central axis of the neck 62. All six apertures 72 communicate with a central void within the head 60. This central void is created because each aperture 72 passes completely through the hexagonal head 60. The top surface of the head 60 is relatively flat and smooth.

The upper jaw 64 includes a threaded hole 74 that accommodates the lower portion of the neck 62 (which is best shown in FIGS. 10-12). The threaded neck can be screwed into or out of this threaded hole 74 in the upper jaw 64 for purposes of biasing the jaws apart from one another or to allow the jaws to be moved together to a closed position.

The apertures 72 are provided to accommodate a standard tool 78 (FIG. 20 only), and especially its thin handle portion 80 which readily fits into an aperture 72, thereby engaging the hexagonal head 60 so that it can be manipulated rapidly by a logger. (Incidentally, the tool 78 is carried by most loggers because it is used to service chain saws.) It is important to note that the hexagonal head 60 is easily and rapidly manipulated by hand as well. One of the major advantages of this quick release mechanism is that no tools are required to effect release. However, use of a handy tool 78 will make a fast release even faster, so that such a practice is encouraged.

The lower jaw 66 is generally somewhat U-shaped and includes a bottom plate 82, having a pair of upstanding longitudinally extending side walls 84 which form an interior longitudinally extending trough or channel 86. The plate 82 has a bottom surface with a forwardly located beveled edge 87 so as to enable shifting movement to receive the studs as hereinafter described.

The upper jaw 64 has a number of unusual shaped-related characteristics best illustrated in FIGS. 1, 2 and 13 of the drawings. Details of the components or elements of the upper jaw are best illustrated in FIGS. 3-10 of the drawings.

It can be seen that the upper jaw comprises a top plate 88 which spans the transverse dimension of the lower jaw 66. The top plate 88 is also integrally provided with a longitudinally extending, downwardly struck rib 90 which extends into and fits within the trough 86, as best illustrated in FIGS. 1 and 13. Moreover, the rib 90 will extend for the full longitudinal dimension of the trough 86, as best illustrated in FIGS. 10-12 of the drawings. At its rearward end, the rib 90 integrally expands into a transversely enlarged hub or so-called "plug" 92 which also fits within the trough 86. The side walls of the hub 92 are closely spaced to the interior surfaces of the upstanding walls 84 on the bottom jaw and receive the hinge pin 68 in close proximity to one of the transverse ends of the upper and lower jaws.

The upper jaw 64 also has a frontal overhang 94 which extends downwardly from the top plate 88 and has a lower end 95 which is substantially co-planar with a bottom wall 97 on the lower jaw 66 as more fully illustrated in FIGS. 2, 5 and 10 of the drawings. The overhang 94 also has a width in the transverse dimension, that is substantially equal to the overall width of the lower jaw, as is more fully apparent in FIGS. 2, 3, 4 and 6 of the drawings. In this way, there is an interlocking construction which exists between the upper and lower jaws and which is also evidenced by reference to FIGS. 7, 9, 10 and 17 of the drawings.

The lower jaw 66 is also provided with a rectangularly shaped opening 96 which is more fully illustrated in FIGS. 1, 7 and 13 of the drawings. It should be observed that this opening 96 also has its forwardly presented edge (that is, the upwardly presented edge in the orientation of FIG. 7) in communication with a semicircular opening 98 in the bottom wall. When the jaws 64 and 66 are in the closed position, as illustrated, for example, in FIG. 5, the enlarged hub, or so-called "plug" 92, will have its lower end fitted within the rectangularly shaped opening 96. The hub 92 also has a slot 100 which also communicates with the semi-circular opening 98. This slot 100 must communicate with the semicircular opening 98 inasmuch as it is necessary to receive one of the two studs 48 in this aligned slot and opening, as hereinafter described in more detail.

By reference to FIGS. 11, 12, 17, and 18, it can be observed that the slot 100 is in communication with the opening 98 so as to receive a stud 48. This is crucial because this alignment enables receipt of the stud in a position where a clamping arrangement can be achieved. It can be observed that there is a shoulder 102 which surrounds the slot 100 (See FIG. 3) and which is received by an enlarged end of the stud 48, as hereinafter described.

The overhang 94 of the upper jaw 64 also has a somewhat inclined forwardly presented face 104 with a front opening elongate slot 106 to receive one of the studs 48. In this case, it can be seen that the slot 106 is located in a flat plate section 108 of the overhang 94. Further, there is a shoulder 110 which surrounds the slot 106

FIG. 10 illustrates the arrangement of the jaws when they are in the fully closed position, and FIG. 11 illustrates the arrangement of the jaws when they are in the fully opened position. FIG. 12 illustrates the position of the jaws when they are biased toward a open position and in a clamping position, that is, a position where they will tightly clamp the stud in a manner as hereinafter described. Thus, in accordance with the above-outlined construction, it can be observed that the upper jaw 64 can be in a fully opened position with respect to the lower jaw, as shown in FIG. 11 and in a fully closed position, as shown in FIG. 10. The upper jaw can also be in a clamping position, as shown in FIG. 12.

The clamping position is achieved when the hexagonal head 60 is rotated, causing rotation of the threaded shaft 62. The shaft 62 has a lower end which bears against the upper surface of the bottom plate 82, as best illustrated in FIG. 10 and 12 of the drawings. When the shaft 62 is rotated so that it does not protrude beyond the threaded hole 74, the two jaws will be in the fully closed position, as shown in FIG. 10. However, when the enlarged head 60 and hence the shaft 62 are rotated to the position as shown in FIG. 12, the upper jaw 64 will be biased upwardly with respect to the lower jaw 66 to assume the clamping position, as illustrated in FIG. 12 of the drawings. FIG. 20 illustrates the quick release device in a position where it has been slid onto the studs 48, but where there has been no clamping action since the two jaws are not slightly separated from one another.

Referring now in more detail to FIGS. 14 and 15 of the drawings, the modified arrangement of the studs 48 is more fully illustrated. In this case, the studs 48 comprise an elongate shank 111 which is initially circular in cross-section, but has a pair of opposed flats 112. The studs 48 do not necessarily include a threaded exterior surface. At their outer ends, each of the shanks 111 have a diameterally reduced extension 113 integrally formed therewith. In the embodiment as illustrated, the diameterally reduced extension 113 may be rectangular in cross-section, although this is not absolutely necessary. At its outermost end, the extension 113 integrally merges into an enlarged stud head 114, thereby forming a notched end 116. This notched end 116 is also crucial in that it cooperates with the upper jaw in order to achieve the clamping action, as hereinafter described.

FIG. 14 illustrates in phantom lines, a nut 118 at the end of the stud 48 on the clutch mechanism of the motor assembly. This nut 118 could be used on the outer end of the stud if the latter were threaded and shows the position of the nut if used with a conventional stud. In actuality, the nut 118 does not form part of the present invention and would not be used when the quick release device of the present invention is employed.

Returning now to FIGS. 11, 12, 17 and 18, it can be seen that the studs 48 can project into the upper jaw. In this case, the clamping assembly must be shifted longitudinally with respect to, and in a direction perpendicular to, the central axis of each of the studs 48 so as to receive the studs 48. As this occurs, the notched end portion 116 of one of the studs will move into the slot 106. Furthermore, the stud head 114 of one stud 48 will ride on and engage the shoulder 110, as best illustrated in FIG. 18 of the drawings. The other of the studs 48 will extend upwardly through the opening 98 and the aligned slot 100, as previously described. When the clamping assembly is shifted, as previously described, the notched end 116 of this second stud will ride upon and engage the shoulder 102. Thus, the studs are then in a position where the jaws can be clamped to the studs.

In the position as illustrated in FIG. 17, the clamping assembly has actually been shifted longitudinally with respect to the axis of the studs. In FIG. 17, the upper jaw and the lower jaw have not been shifted to the clamping position. However, when the enlarged head 60 and the shaft 62 are rotated, the shaft 62 will bear against the lower jaw, as shown in FIG. 18, thereby raising the upper jaw to the clamping position as illustrated in FIG. 18. As this occurs, the notched end of one of the studs 48 will become tightly engaged with the shoulder 110. The notched end of the other of the studs 48 will become tightly engaged with the shoulder 102, thereby tightly clamping the quick release mechanism to the studs 48 extending outwardly from the motor assembly of the chain saw.

In accordance with the above-outlined construction, it can also be observed that by turning the head 60, and hence the shaft 62 in the opposite direction, the threaded shaft 62 will be retracted into the threaded hole 74 thereby allowing the upper jaw to reach the fully closed position, as illustrated in FIG. 17. In this way, the clamping assembly can be shifted longitudinally in order to remove the same from the studs.

It can be seen that only a slight rotating action of the head 60, and hence the shaft 62, is required in order to tighten or release the clamping action. Thereafter, it is only necessary to slide the quick release mechanism with respect to the stud and the quick release mechanism is essentially removed from the studs extending from the motor assembly. In this way, the bar and chain, if they should become locked in a particular condition as, for example, in a tree, can be sacrificed so that the user of the device can immediately carry the quick release device and the much more expensive motor assembly of the chain saw to a safe location and out of the way of a falling tree.

As indicated previously, the quick release device of the invention replaces the threaded nuts which were threadedly secured to the studs in order to hold the outer and inner plates and the side plate of the motor assembly, as well as the bar and chain to the motor assembly. In contrast to the present invention, these threaded nuts are often very difficult and time-consuming to remove, thereby hindering one's effort to rapidly disconnect the cutting assembly from the motor assembly. The present invention is achieved through the use of the unique studs 48 which have the notched ends 116, as previously described. It should be observed that the outer stud head 114 has a size which is no greater in any dimension than the overall diameteral size of the stud shank 111. Nevertheless, the stud head 114 does have a size which is greater than the reduced extension 113. The size of the stud head is such that it is capable of being moved into the opening 98 and the slot 100 aligned therewith.

FIG. 16 illustrates a slightly modified form of stud 120 which may also be used in accordance with the present invention. This stud 120 includes a circularly shaped shank 122, similar to the shank 111, and a diameterally reduced section 124, as well as an enlarged stud head 126 In this case, the stud head 126 is comprised of a pair of perpendicularly arranged, somewhat elliptically shaped elements 128. Again, it can be observed that the elements 128 have a size no greater than the diameteral cross-section of any portion of the stud 120.

FIG. 16 illustrates only one type of modified stud which may be used in accordance with the present invention. It should understood that there are numerous shapes which can be used on a stud end to be effective with the clamping assembly of the present invention. It is only necessary that there be an inwardly-presented shoulder on a stud head so as to engage the shoulder 110 and the shoulder 102.

When the upper jaw is interlocked with the studs, the quick release device of the present invention is actually taking the place of the threaded nuts. However, the quick release device of the invention functions as an adjustable fastening means which attaches to the distal ends of the studs 48 in order to secure the side plate 32 and the cutting assembly 35, as well as the inner bar plate 54 and the outer bar plate 56 to the motor assembly. Turning of the hexagonal head 60 in the proper direction, either manually or by using a tool, such as the tool 78, will force the upper jaw into contact with the lower jaw and thereafter create the clamping action with the studs 48 in the manner as previously described. Since the side plate 32 is often times made of a plastic material or a thin gauge metal, it is sometimes desirable to include the reinforcing plate 58, as previously described. This will ensure that excess tightening of the quick release device will avoid undue pressure on the side plate 32. Naturally, all of the aforesaid components will have a pair of holes which align with the studs 48 in order to receive the studs 48.

In use, when the quick release device 30 is installed on the studs 48, as previously described, the following procedures can be used to effect rapid disconnection of the cutting assembly 35 from the motor assembly 34. Initially, the hexagonal head 60 is turned to loosen the clamping action of the upper jaw and permit a lowering of the upper jaw to be in contact with the lower jaw in a closed position, as illustrated in FIG. 17. This will, of course, involve the partially unscrewing of the shaft 62 within the threaded hole 74. This action may also be executed manually or with the tool 78, as previously described.

It can be seen that the hexagonal head 60 includes six apertures 72 so that an aperture 72 is always readily accessible to a tool or a tool handle, regardless of the orientation of the head 60. This is in sharp contrast to the convention threaded nuts used in the prior art and which were not always readily accessible with tools and which were rarely manually removable. Indeed, the nuts were usually clamped down with a wrench or like device and accordingly, manual removal was virtually impossible. In order to effectuate removal of the nuts in the prior art systems, it was necessary to literally locate a wrench, and thereafter individually release each nut. This usually required a rotation of the wrench for several turns before the nut could be released sufficiently so that it could be manually unthreaded from the stud. Recognizing that speed is of the essence in the application of the quick release device 30, it is a noteworthy feature that the head 60 can be rotated by only a simple turn to quickly release the upper jaw 64 and thereby rapidly loosen the clamping action supplied by the quick release device 30 on the studs 48.

When the clamping action of the quick release device has been sufficiently loosened, the user of the quick release device will slide the same relative to the studs 48, such that the groove portion or notched end of the stud will be released from engagement with the slot 106 and 100, and will be located for passage of the distal ends of the studs beyond the slots. When the studs 48 are no longer interlocked with the slots, that is in engagement with the shoulders 102 and 110, one can slip the quick release device 30 off of the studs 48. At that point in time, nothing will be securing either the optional reinforcing plate 58 or the side plate 32 to the studs so that these elements are quickly and easily removed. It may be desirable to have the reinforcing plate 58 attached to the side plate 32 by means of screws or like fasteners so that both of these components can be removed as an individual assembly. This will provide access to the outer bar plate 56 which is next readily removed. At that point in time, it is a simple matter to disengage the cutting assembly 35 from the chain saw motor-drive mechanism, or so-called power unit. Since the bar 36 is sandwiched between the inner and outer bar plates 54 and 56, it offers little resistance to removal once access is gained.

Assuming that the bar 36, or chain of the cutting assembly 35, becomes trapped within a collapsing tree trunk, a logger can quickly release the device 30, remove the plates 58 and 32, as well as the bar plate 54 and possibly the bar plate 56 and then disengage the studs 48 and thus, release the entire motor assembly from the trapped bar 36. Although this process has been described at length, it takes only a few seconds to execute by a practiced logger, and a user of the quick release device will ultimately result in saving a valuable motor assembly. The forfeiture of the chain and the saw bar is not disastrous, since these elements are easily replaced at a relatively low cost. Finally, utilizing the quickly release device, a logger's life will not be forfeited in a vain struggle, attempting to free a tapped saw from a deadly falling tree.

Thus, there has been illustrated and described a unique and novel quick release device for use with chain saws and which therefore fulfills all of the objects and advantages which have been sought. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention.

Having thus described the invention, what I desire to claim and secure by Letters Patent is:

1. A quick release device for attachment of a cutting assembly of a chain saw comprised of a chain saw bar and a cutting chain to a motor assembly of the chain saw and allowing an operator to rapidly detach the cutting assembly from the motor assembly of the chain saw, the chain saw having a motor housing and a plurality of studs wherein the studs engage both the bar and an outer side plate forming part of the motor assembly; said quick release device comprising:
   a) a clamping member having a pair of jaws which are movable relative to one another for simultaneously releasably engaging each of the studs and thereby clamping the bar and chain of the cutting assembly and the outer side plate to the motor assembly of the chain saw and thereby eliminating the necessity of nuts to hold the side plate and cutting assembly to the motor assembly; and
   b) a manually movable mechanism on said clamping member for rapidly tightening one of said jaws against the side plate wherein said quick release device does not otherwise interact with the side plate or the cutting assembly except to clamp the cutting assembly and side plate on the studs to the motor assembly, said manually movable mechanism also being adapted to release the clamping action provided by said clamping member to enable removal of the side plate and cutting assembly; wherein said clamping member comprises an upper jaw and a lower jaw, hinge means connecting said upper and lower jaws for allowing the upper jaw to move relative to the lower jaw so that at least one of the jaws can be moved relative to the other to an open jaw position and a closed jaw position.

2. A quick release device as set forth in claim 1 wherein said upper jaw includes first engagement means for releasably engaging one of said studs and second engagement means for releasably engaging another of said studs.

3. A quick release device as set forth in claim 2 wherein said first and second engagement means comprise slots, said device being used in combination with the chain saw having studs that include a notched portion proximate the distal ends of said studs and wherein said slots engage the notched portion of each stud when said quick release device is attached to the studs of said chain saw.

4. A quick release device as set forth in claim 1 further including a reinforcing plate located between the body of the quick release device and the side plate of the chain saw.

5. A quick release device for allowing an operator to rapidly detach a bar of a chain saw from the motor assembly of the chain saw, said chain saw having at least one stud that extends outwardly from the motor assembly and engages the bar, said device comprising:
   a) a body comprised of an upper jaw and a lower jaw to enable simultaneous engagement of the at least one stud in a releasable manner to thereby clamp the body to the motor assembly;
   b) hinge means connecting the upper jaw and the lower jaw and allowing the upper jaw to move relative to the lower jaw so that the upper jaw can be movable to an open jaw position and a closed jaw position with respect to the lower jaw; and
   c) clamping means associated with the jaws on said body for receiving the stud from the motor assembly so as to be clamped in the jaws and thereby clamp the bar to the motor assembly, said clamping means comprising a threaded shaft extending into one of said jaws, said clamping means causing a clamping action to lock the stud in the jaws when the threaded shaft is rotated to bias the jaws apart and releasing the clamping action when the threaded shaft is rotated to allow one of the jaws to be moved toward the other of the jaws.

6. A quick release device as set forth in claim 5 wherein said shaft comprises a head and a threaded neck with said threaded neck being in threaded engagement with a threaded hole in the upper jaw.

7. A quick release device as set forth in claim 6 wherein said head includes aperture means for facilitating engagement of said head by a tool.

8. A quick release device as set forth in claim 5 wherein a pair of studs extend outwardly from said motor assembly and said clamping means engages both of the studs in said jaw.

9. A quick release device as set forth in claim 8 wherein said upper jaw includes first engagement means for releasably engaging one of the studs and also includes second engagement means for releasably engaging the other of said studs.

10. A quick release device as set forth in claim 9 wherein said first and second engagement means together comprise at least two slots.

11. A quick release device as set forth in claim 10 in combination with the chain saw having said pair of studs wherein said studs include notched portions proximate the distal ends of the studs, said slots being arranged to engage the notched portion of each stud when said threaded shaft is rotated to bias said jaws apart from one another to enable said quick release device to be attached to said chain saw.

12. A quick release device as set forth in claim 11 wherein said lower jaw has a bottom surface disposed in juxtaposed relation to said motor assembly when said device is clamped on said studs.

13. A quick release device as set forth in claim 11 wherein said threaded shaft is threaded in an opening in said upper jaw and has an end which bears against but does not thread into said lower jaw.

14. A quick release device for allowing an operator to rapidly detach a motor assembly of a chain saw from a bar of the chain saw, said chain saw having a plurality of studs which extend outwardly from the motor assembly and engage both the bar and an outer side plate, said quick release device comprising:
   a) a body comprised of an upper jaw and a lower jaw to enable simultaneous engagement of each of the studs in a releasable manner to thereby clamp the body to the motor assembly;
   b) hinge means in proximity to one of the ends of each of said jaws connecting the upper jaw and the lower jaw and allowing the upper jaw to move relative to the lower jaw so that the upper jaw can be movable to an open jaw position and a closed jaw position; and
   c) clamping means associated with the jaws on said body for clamping the side plate to the motor assembly, said clamping means being operable with said upper jaw to allow said upper jaw to fully close with respect to said lower jaw so that no clamping action can occur when the jaws are fully closed wherein said clamping means comprises
   d) at least one rotatable member for providing the clamping action by tightening and loosening said clamping means, said rotatable member biasing said upper jaw away from said lower jaw to an open position to provide a clamping action and thereby by tightly hold the studs in the body of the quick release device.

15. A quick release device as set forth in claim 14, wherein said rotatable member comprises a threaded shaft which is in threaded engagement with a threaded hole in said upper jaw.

16. A quick release device as set forth in claim 15 wherein a head is mounted on said shaft and said rotatable member can only bias said upper jaw away from said lower jaw for a limited distance.

17. A quick release device as set forth in claim 16 wherein said upper jaw includes first engagement means for releasably engaging one of the studs and also includes second engagement means for releasably engaging another of said studs when said upper jaw is biased away from said lower jaw upon rotating said rotatable member.

18. A quick release device as set forth in claim 17 wherein said first and second engagement means comprise slots, said studs comprising notched portions proximate the distal end of the studs, said slots being arranged to engage the notched portion of each stud when said quick release device is attached to said chain saw.

19. A quick release device as set forth in claim 14 wherein said lower jaw has a bottom surface and said bottom surface includes an opening sized to allow insertion of a stud therethrough.

20. A quick release device for allowing an operator to rapidly detach a motor assembly of a chain saw from a bar of the chain saw, said chain saw having a plurality of studs which extend outwardly from the motor assembly and engage both the bar and an outer side plate, said quick release device comprising:
   a) a body comprised of an upper jaw and a lower jaw to enable simultaneous engagement of each of the studs in a releasable manner to thereby clamp the body to the motor assembly, said lower jaw being disposed in juxtaposed relation to said motor assembly;
   b) openings formed in said upper jaw to releasably receive each of said studs;
   c) engagable means associated with said openings to engage the studs and hold said studs in said openings;
   d) hinge means connecting the upper jaw and the lower jaw and allowing the upper jaw to move relative to the lower jaw so that the upper jaw can be hingedly moveable to an open jaw position and a closed jaw position;
   e) threadedly rotatable means associated with the jaws on said body for clamping the side plate to the motor assembly, said threadedly rotatable means comprising a threaded shaft which cooperates with and extends into said upper jaw to enable a locking of the upper jaw and the lower jaw in a clamping condition while said studs are received in said jaws, said threaded shaft operating independently of and not contacting said studs so that the studs engage the engagable means to create the clamping action; and
   f) said threadedly rotatable means further comprising at least one member attached to said threaded shaft to facilitate the clamping action provided by said clamping means and to facilitate releasing the clamping action provided by said jaws wherein the upper jaw is moved toward the lower jaw to thereby enable removal of the engagable means from the studs.

21. The quick release device as set forth in claim 20 further characterized that said engagable means comprise flanges which extend around a portion of the openings.

22. The quick release device as set forth in claim 21 further characterized in that said studs have projections on their outer ends which engage with the flanges to provide the clamping action.

23. The quick release device as set forth in claim 22 further characterized in that there are a pair of spaced apart openings and the openings are in the form of elongate slots which allow the studs to slide into the slots from one of the ends of the slots.

24. A quick release device for allowing an operator to rapidly detach a motor assembly of a chain saw from a bar of the chain saw, said chain saw having a plurality of non-rotatable studs fixedly secured to the motor assembly and which extend through openings in and engage both the bar and an outer side plate, and where said studs have notched portions in proximity to their ends remote from the motor assembly, said device comprising:
   a) a body having a pair of hingedly mounted jaws;
   b) a first of said jaws having an opening therein to receive at least one of said studs;
   c) a second of said jaws having elongate slots to also receive said studs;
   d) flange means surrounding portions of said elongate slots to engage the notched portions of said studs;
   e) clamping means associated with the jaws of the body for causing relative movement of the jaws apart from one another to enable the flanges to engage the notched portions of the studs thereby securing the side plate to the motor assembly in a clamping action wherein said clamping means includes
   at least one member to facilitate movement of said clamping means.

* * * * *